United States Patent [19]

Matsuhashi

[11] Patent Number: 4,909,570
[45] Date of Patent: Mar. 20, 1990

[54] AUTOMOTIVE SEAT WITH WALK-IN DEVICE

[75] Inventor: Masahiro Matsuhashi, Akishima, Japan

[73] Assignee: Tachi-S Co., Ltd., Akishima, Japan

[21] Appl. No.: 295,800

[22] Filed: Jan. 11, 1989

[30] Foreign Application Priority Data

Jun. 30, 1988 [JP] Japan .................. 63-87019[U]

[51] Int. Cl.⁴ .............................................. B60N 1/04
[52] U.S. Cl. .................................. 297/341; 297/346; 248/429
[58] Field of Search ............. 297/341, 346; 248/429

[56] References Cited

U.S. PATENT DOCUMENTS

| | | | |
|---|---|---|---|
| 3,811,726 | 5/1974 | Muraishi et al. | 297/341 |
| 4,101,169 | 7/1978 | Muraishi et al. | 297/341 |
| 4,143,911 | 3/1979 | Sakakibara et al. | 297/341 |
| 4,449,752 | 5/1984 | Yasumatsu et al. | 297/341 |
| 4,621,867 | 11/1986 | Perring et al. | 297/341 |
| 4,666,208 | 5/1987 | Tatematsu et al. | 297/341 |
| 4,671,571 | 6/1987 | Gionet | 297/341 |
| 4,742,983 | 5/1988 | Nihei | 297/341 |

Primary Examiner—Francis K. Zugel
Attorney, Agent, or Firm—Browdy and Neimark

[57] ABSTRACT

An automotive seat with a walk-in device, which permits the forward movement of the seat by inclining the seat back forwardly for a walk-in purpose. The walk-in device in the present invention comprises a rotatable lever plate, an actuator pin fixed on the lever plate, and a crank portion formed in a lock lever associated with a locking mechanism. The actuator pin is in a contact with the crank portion, and as such, when the seat back is forwardly inclined, the rotatable lever plate is caused to rotate, whereby the crank portion is rotated via the actuator pin so as to actuate the locking mechanism to release the locked state of the seat, allowing the seat to be forwardly moved for the walk-in purpose.

6 Claims, 5 Drawing Sheets

AUTOMOTIVE SEAT WITH WALK-IN DEVICE

BACKGROUND OF THE INVENTION

1. Field of the Invention

The present invention relates to an automotive seat with a walk-in device, of the type having a memory device, in which the seat may be moved forwardly for walk-in operation and positively returned to its predetermined home position, and in particular, relates to the walk-in device for effecting the walk-in operation of the seat so that the forward inclination of the seat back releases the locked state of a slide device of the seat and causes the seat back to move forwardly.

2. Description of the Prior Art

For use in a walk-in seat, there has been available various kinds of walk-in devices which, in most cases, are provided with a memory device, whereby the seat may be moved forwardly for allowing the entry of a passenger into a rear seat and returned to its predetermined home position. A conventional example of such walk-in device is shown in FIGS. 1(A) and 1(B) of the accompanying drawings. Referring to the prior art shown, a walk-in device (3') is provided laterally of a slide rail device (2') which consists of an upper rail (22') and a lower rail (21'). The upper rail (22') is slidably fitted to the lower rail (21') and may be brought to a locked or unlocked state via a locking mechanism (51') by operation of an operation lever (54'). The locking mechanism (51') has plural holes into which engaged are some of plural teeth (52') formed at the lower rail (21') and is actuated by rotation of the operation lever (54') so as to bring the holes into engagement with or disengagement from the teeth (52'), thereby locking or unlocking the sliding movement of the upper rail (22') along the lower rail (21'). To that operation lever (54'), operatively connected is the walk-in device (3') which comprises a release wire (34'), an arcuate rotatable plate (32') rotatably mounted at the lower rail (21') and a plate-like piece (30'). The release wire (34') is connected to a seat back (not shown) of the seat, and, according to this prior art, when the seat back is forwardly inclined, the release wire (34') is pulled, causing the movable plate (32') to rotate about a pivot point (32'a) to contact and push the plate-like piece (30') welded to the lever (54'). Thus, with rotation of the rotatable plate (32'), the lever (54') is caused to rotate via the plate-like piece (30') in a direction to release the engagement of the holes of the locking mechanism (51') with the teeth (52'), and then, the locked state of the slide rail device (2') is released, and by means of a spring (not shown), the seat is caused to move forwardly via the sliding movement of the upper rail (22') upon the lower rail (21').

The above-mentioned prior art, however, has been found defective in a great likelihood of the rotatable plate (32') being worn or abraded, due to the fact that in operation, the rotatable plate (32) is initally at its side edges in a full contact with the plate-like piece (32'), but with further rotation, such contact of the plate (32'), because of its side edges being inclined relative to the plate-like piece (30) and only contacted with one side edge of the same, is transformed into a small localized or point contact with respect to the plate-like piece (30'). As a result, the contact area of the rotatable plate (32') against the plate-like piece (30') will be gradually abraded and recessed, with the result that the rotation amount of the plate-like piece (30') will become so reduced that the lever (54') is not rotated sufficiently to effect the diesengagement of the holes of the locking mechanism (51') and the walk-in device (3') is not worked. Additionally, in case that the operative stroke of the release wire (34') is relatively small, there is need to reduce the length (l) of the rotatable plate (30') in order to attain a sufficient rotation amount of the plate-like piece (30'), in which case, the load of the rotatable plate (32') against the plate-like piece (30') is increased in excess, which makes it more easily for the plate-like piece (30') to be worn or abraded, thus resulting in the failure of the walk-in device (3').

The above-described prior art is provided also with a memory device (4'), which comprises a base plate (31'), a memory plate (41') which is rotatably mounted via a pin (41'c) on the base plate (31') and a guide plate (41'e). In brief, according to this conventional memory device (4'), when the plate-like piece (30') is rotated in the operation of the walk-in device (3'), the projection (32'a) formed on the rotatable plate (32') is engaged into the recessed part (41'd) of the memory plate (41'), then keeping unlocked the locking mechanism (51'), and with the movement of the upper rail (22), the hook part (41'b) of the memory plate (41') is displaced beyond the end (41'e-1) of the guide plate (41'e), whereas when the upper rail (22) is moved back, the hook part (41'b) is also moved back and rides over the end (41'e-1), thereby rotating the memory plate (41') to disengage the projection (32'a) from the recessed part (41'd) and allowing the locking mechanism ((51') to effect its locking at the previously locked area of the teeth (52), whereupon the seat is returned to its normal set position. However, the defective aspect of this memory device (4') is that the provision of the guide plate (41'e) under the lower rail (21) forms a downward protrusion, which results in an unfavorable increased height of the slide rail (2'), thus increasing the height of the seat and taking up much of the interior space of automobile, and that the guide plate (41'i e) is easily subjected to damage, due to its projecting nature, during transfer or assemlage thereof, and further becomes a cause of giving flaw to a carpet on the floor of automobile.

SUMMARY OF THE INVENTION

With a view to obviating the above-mentioned drawbacks, it is a purpose of the present invention to provide an automotive seat with a walk-in device, in which the main mechanic parts of the walk-in device are free of wear or abrasion trouble and a memory device used is simply incorporated therein so as not to cause any external damage or inconvenience.

In attaining the above purpose, the present invention comprises a seat having a seat back and a seat cushion, the seat back being inclinable forwardly and backwardly via a reclining device relative to the seat cushion, a slide rail provided under the seat, the slide rail having an upper rail and a lower rail such that the upper rail fixed to the seat is slidable upon the lower rail fixed on the floor of an automobile, a locking mechanism provided at the slide rail, a walk-in device which is provided at the slide rail and operatively connected with a release wire of the reclining device, the walk-in device including a rotatable lever plate, an actuator pin provided on the rotatable lever plate, and a clank portion formed in a lock lever of the locking mechanism, and a memory device including a memory plate which is rotatably disposed laterally of the lower rail and a forward end of the lower rail.

Accordingly, in operation, when the seat back in forwardly inclined, the release wire is drawn to cause the rotation of the rotatable lever plate of the walk-in device, which in turn causes the anctuator pin to push and rotate the clank portion of the lock lever, thereby actuating the locking mechanism to release the locked state of the slide rail and then the seat is caused to move forwardly by means of a forwardly biasing member for the walk-operation purpose. Simultaneously with this walk-in operation, the memory device is actuated by the walk-in device, with its memory plate being brought into a provisionally engaged state to thereby retaining the unlocked state of the slide rail. According to this memory device, when the seat is moved back after the walk-in operation, the memory plate thereof collides against the forward end of the lower rail and is thereby released from its engaged state so as to allow the lock mechanism to effect the locking of the slide rail, whereupon the seat is returned to its home position.

It is appreciated that the actuator pin and clank portion are in a small localized or point contact with each other, which greatly reduces the sliding friction of the actuator pin against the lock lever and eliminates the wear or abrasion problem associated with the walk-in device as found in the above-mentioned prior art, and that the memory device is just disposed laterally of the slide rail, which means to have no externally projected element, and thus does not create such damage and undesired increase of height of the seat as encountered in the prior art.

DETAILED DESCRIPTION OF PREFERRED EMBODIMENT OF THE INVENTION

Figure 2:
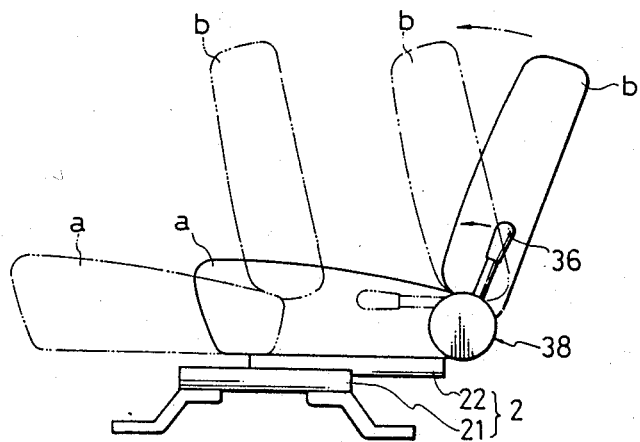
FIG. 2 is a side view of an automotive seat with a walk-in device in accordance with the present invention, which explanatorily shows the movement of the seat.
Figure 4:
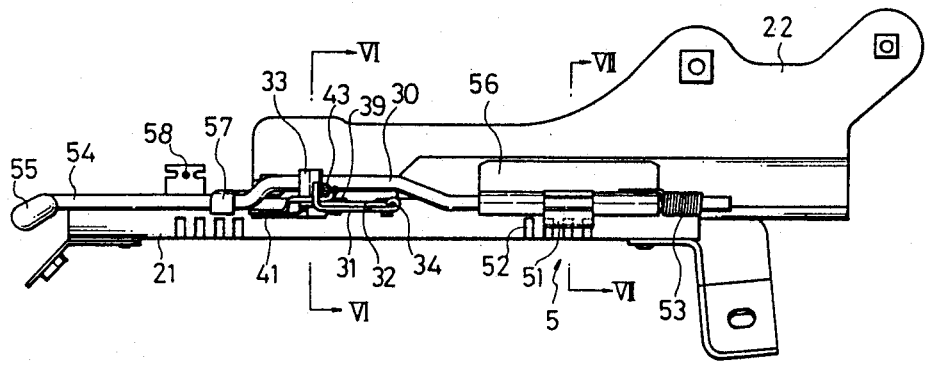
FIG. 4 is a side view of the same principal part of the present invention as in the FIG. 3.
Figure 5:
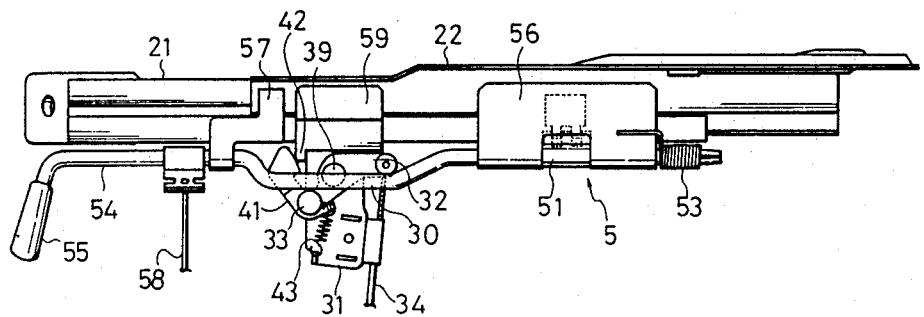
FIG. 5 is a plan view of the same principal part of the present invention as in the FIG. 3.

Referring, firstly, to FIG. 2, the diagram shown depicts a general walk-in operation of a walk-in type of seat (A) which is provided with a walk-in device (3) (see FIG. 3) of the present invention, as will be specified later. The seat (A) has a slide rail (2) including an upper rail (22) as a movable rail and a lower rail (21) as a stationary rail, the upper rail (22) being slidably fitted in the lower rail (21) which is fixed on a floor of automobile (not shown), allowing the seat (A) to be movable forwardly and backwardly. The seat (A) is also provided with a locking mechanism (5) (see FIG. 3) so that the seat (A) may be locked against movement at a desired point, and further a reclining device (38) is equipped at the joint between a seat cushion (a) and seat back (b) in order to effect the forward and backward inclination of the seat back (b) relative to the seat cushion (a).

As understandable from FIG. 2, when the seat back (b) is forwardly inclined in the arrow direction, the seat (A) is automatically moved forwardly from the solid line to the two-dotted chain line by means of the walk-in device which, as will be stated, is actuated to release the locked state of the seat (A) in cooperation with a forwardly biasing member (not shown, preferably a helper spring) adapted to bias the seat (A) in a forward direction.

Figure 1A:
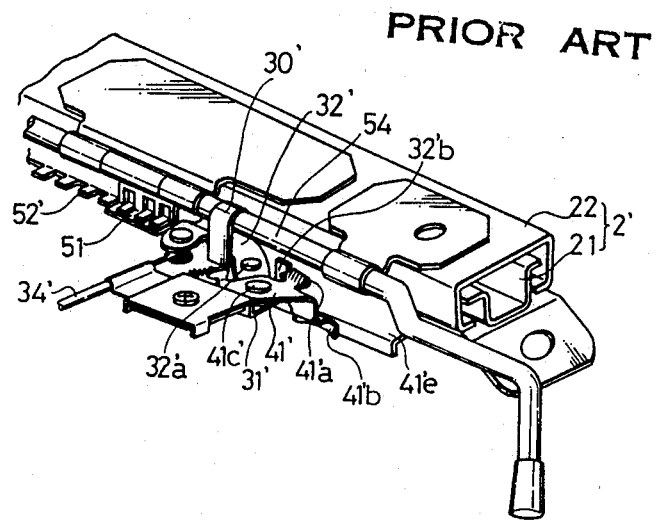
FIG. 1(A) is a partially broken perspective view of a conventional seat with a walk-in device.
Figure 1B:
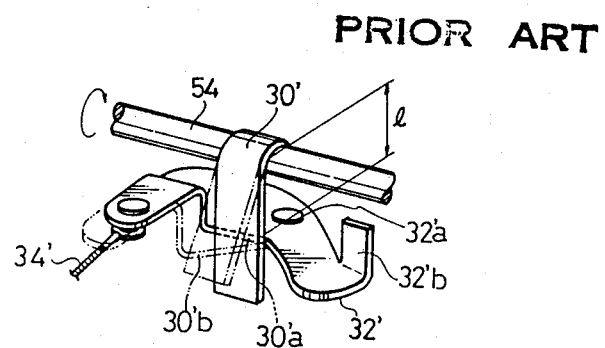
FIG. 1(B) is a partially enlarged view of a principal part of walk-in device in the conventional seat.
Figure 3:
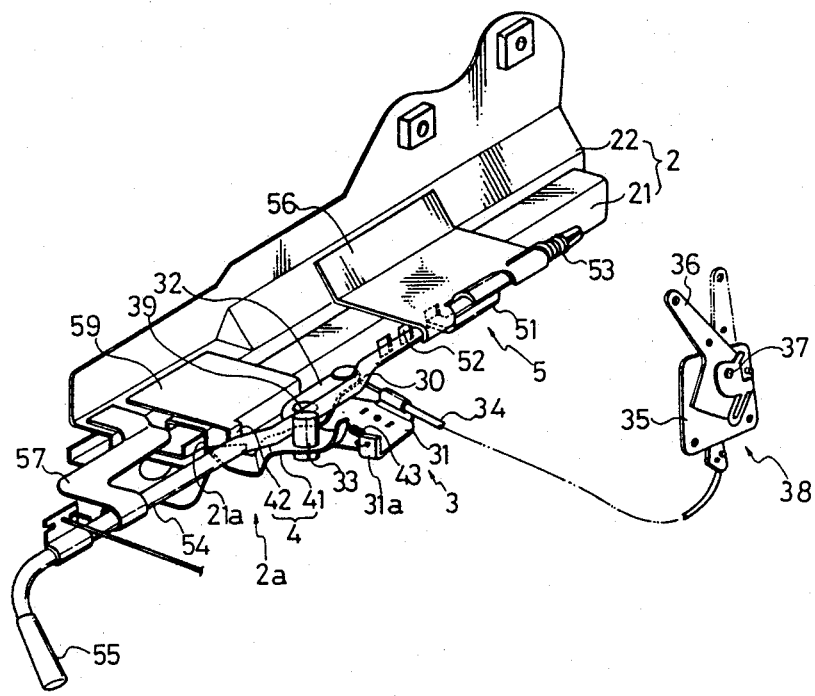
FIG. 3 is a perspective view of a principal part of the present invention.

Referring now to FIG. 3, there is illustrated a principal part of the present invention.

Designations (2), (22) and (21) refer to the abovementioned slide rail, and its upper and lower rails, respectively. Although not shown, another same slide rail is provided in parallel with the slide rail (2), constituting thus a complete pair of slide rails under the seat (A), and for that reason, the slide rail (2) is only shown in the drawings as forming one-side part of the complete pair of slide rails, for the sake of simplicity in description.

The lower rail (21) has a plurality of apertures (52) formed at its lateral wall along its longitudinal direction, the apertures (52) being disposed inwardly of the slide rail (2) and facing towards the foregoing another slide rail, and on the other hand, the upper rail (22) is provided with the walk-in device (3).

Specifically, with further reference to FIGS. 3 through 10, the walk-in device (3) comprises a support plate (5) fixed on the inner wall of the upper rail (22), a base plate (31) extending intergrally, continuously from the support plate (59), a pin (39) fixed on the base plate (32), a rotatable lever plate (32) which is rotatably mounted on the base plate (31) via the pin (39) such as to be free to rotate about the pin (39) on a horizontal plane with respect to the lower rail (21), a release wire (34) which is at its one end connected to a first end portion (32a) of the rotatable lever plate (32) and at its other end connected to the reclining device (38), establishing thus an operative connection between the rotatable lever plate (32) and reclining device (38), an actuator pin (33) erected fast on the second end portion (32b) of the rotatable lever plate (32), and a crank portion (30) formed in a lock lever (54).

The lock lever (54) is made of a cylindrical shaft, extending adjacently along the inner side of the slide rail (2).

The crank portion (30) is defined in the lock lever (54) by bending upwardly a part of the lock lever (54) into a generally inverted-U-shaped configuration. As best seen by the solid line in FIG. 6, the crank portion (30) is normally in a contact with the actuator pin (33), orienting obliquely upwards in relation to longitudinal axis of the lock lever (54). It is noted here that the lock lever (54) is rotatably supported by two support brackets (56)(57) along the longitudinal direction of the slide rail (2), and that the obliquely upward orientation of the crank portion (30) is intended to facilitate the ease with which the crank portion (30) is rotated by the actuator pin (33) in an upward direction, as inidcated by the one-dotted chain line in FIG. 6, without a great force required for rotating both crank portion (30) and lock lever (54).

The reclining device (38), as in FIG. 3, is constructed by a base member (35) fixed at the seat cushion (n) and a movable arm member (36) fixed at the seat back (b), such that the movable arm member (36) is rotatably mounted on the base member (35) via pin (37) and connected with the release wire (34), whereby the forward rotation of the seat back (b) causes the arm member (36) to draw the release wire (34) in the arrow direction, so as to rotate the rotatable lever plate (32) for actuation of the walk-in device (3).

Rearwardly of the lock lever (54), there is provided a locking mechanism (%) adapted to lock or unlock the upper rail (22) against or for its slidable movement upon the lower rail (21). The locking mechanism (5) includes a lock plate (51) fixedly attached about the lock lever (54), the lock plate (51) being so formed as to be engaged into one of the apertures (52) of the lower rail (21), and a torsion spring (53) wound around the rearward end portion of the lock lever (54). In this context, the lock lever (54) is a part of the locking mechanism (5) and normally forced to rotate, by the biasing force of the torsion spring (53), in a direction to bias the lock plate (51) into engagement with one of the apertures (52).

Figure 6:
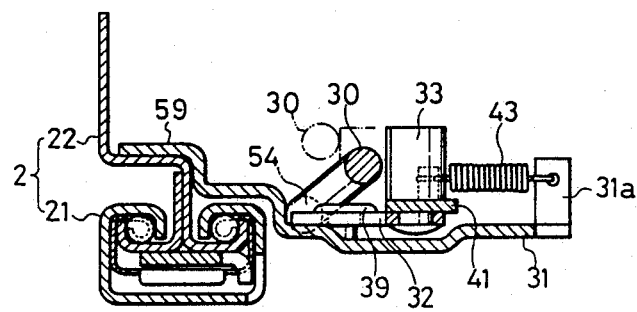
FIG. 6 is a cross-sectional view taken along the line VI—VI in the FIG. 5.
Figure 7:
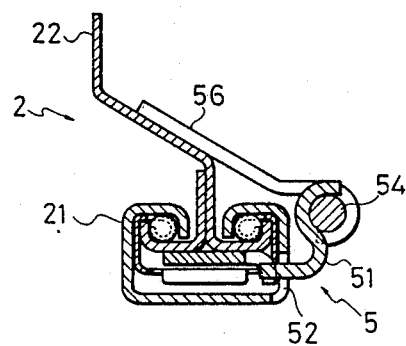
FIG. 7 is a cross-sectional view taken along the line VII—VII in the FIG. 5.
Figure 8:
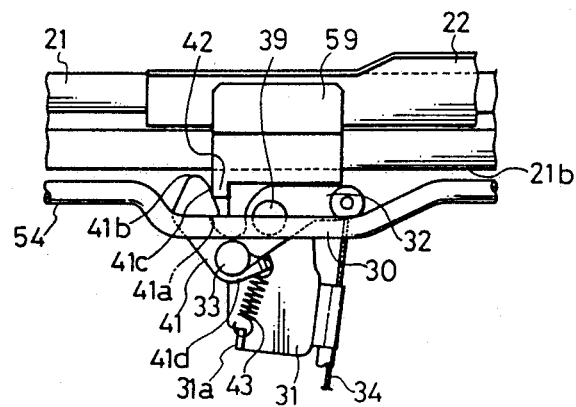
FIG. 8 through 10 are explanatory views showing the actions of the walk-in device and a memory device in accordance with the present invention.
Figure 9:
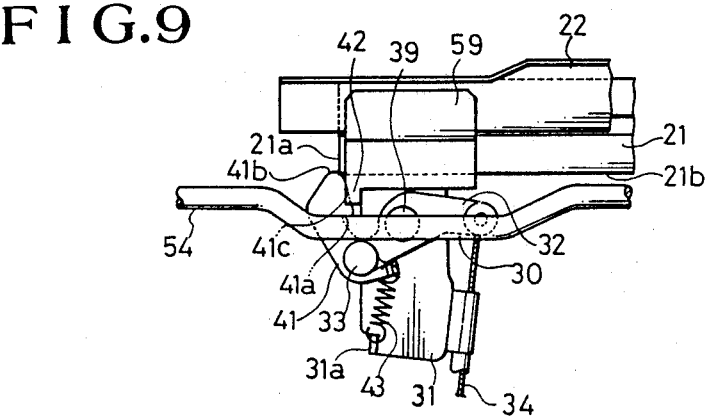

Designation (4) denotes a memory device which is incorporated in the above-described walk-in device (3) and adapted for positively enabling the seat (A) to return to its predetermined home position, after the seat (A) has been moved forwardly for walk-in operation by means of the walk-in device (3). With reference to FIGS. 6, 8 and 9, it is seen that the memory device (4) comprises an engagement protrusion (42) formed at one forward corner of the support plate (59), a memory plate (41) which is at its base end (41b) rotatably, pivotally connected to the lower end portion of the actuator pin (33), and a forward end (21a) of the lower rail (21). The memory (41) is formed generally in a hook-like shape, shape, and essentially composed of a head portion (41b), an abutment edge (41c), a hook-like engagement portion (41a), and the base end (41d), with such an arrangement wherein, in a normal state as shown in FIG. 8, its abutment edge (41c) is biased into abutment against the side edge of the engagement protrusion (42) by virtue of a spring (43) extended between the base end (41d) of the memory plate (41) and the erected part (31a) of the base plate (31). As shown, thus-constructed memory device (4) is disposed inwardly of the slide rail (2), such that both engagement protrusion (42) and memory plate (41) are located laterally of and adjacent to the lower rail (21), with the head portion (41b) being in a slidable contact with the lateral wall (21b) of the of the lower rail (21). With this structure, the memory plate (41) is to be engaged, at its hook-like engagement portion (41a), with the the engagement protrusion (42), in a latching fashion, simultaneously with th operation of the walk-in device (3), and after the walk-in operation, as the seat (A) is moved back, the memory plate (41) collides against the forward end (21a) of the lower rail (21) and is then rotated reversely to actuate the locking mechanism (5) to lock the seat (A) in its original home position. The details of this action will become readable from the following descriptions.

Now, a description will be made of the operation of the above-discussed present invention.

When the seat back (b) is forwardly inclined via the reclining device (38), as shown in FIG. 2, then, the release wire (34) is drawn towards the reclining device (38) by the simultaneous forward ratation of the arm member (36) in a the arrow direction as in FIG. 3, which causes the rotation of the rotatable lever plate (32) about the pin (39) in clockwise direction. Then, the actuator pin (33) on the rotatable lever plate (32) is displaced to push the crank portion (30) of the lock lever (54), whereby as shown in FIG. 6, the crank portion (30) is rotated upwardly from the solid line to the phantom line. In response to such rotation of the crank portion (30), the lock lever (54) is simultaneously rotated about its longitudinal axis, thereby disengaging the lock plate (51) of the locking mechanisms (5) out of the aperture (52) of the lower rail (21), so that the slide rail (2) is released from the locked state, placing the upper rail (22) in a condition slidable along the lower rail (21). The seat (A) is, therefore, moved forwardly as in FIG. 2, by means of the biasing member (not shown) automatically, effecting a walk-in operation for allowing a passenger to sit on a rear seat (not shown) provided behind the seat (A).

Figure 10:
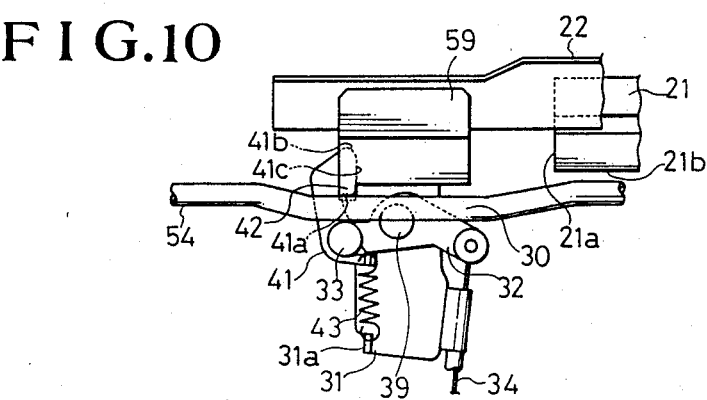

Simultaneously with the above-stated walk-in operation, the memory device (4) is also actuated in an interlocking relation with the walk-in device (3): As observed in FIGS. 8, 9 and 10, while the rotatable lever plate (32) is being rotated by the release wire (34), the memory plate (41) on that plate (32) is displaced towards the slide rail (2), with its abutment edge (41c) being slidingly moved upwardly upon the engagement protrusion (42), and the hook-like engagement portion (41a) of the memory plate (41) is hookingly engaged with the engagement protrusion (42), as shown in FIG. 10, whereupon such latching engagement of the memory plate (41) serves as a means for preventing the reverse rotation of the crank portion (30) as well as of the lock lever (54), thus retaining the disengagement of the lock plate (51) from the apertures (52) against the biasing force of the torsion spring (53). Then when it is desired to return the seat (A) to its original position, the seat (A) is moved back from the walk-in position, at which time, the memory device (4) is transferred towards the lower rail (21) and thus the head portion (41b) of the memory plate (41) is approaching towards the forward end (21a) of the lower rail (21), as understandable from FIG. 10. Accordingly, looking at FIGS. 8, 9 and 10 reversely; namely, as viewed from FIG. 10 to 8 in sequence, the head portion 41b) of the memory plate (41) collides against the forward end (21a) of the lower rail (21), as preceivable from FIG. 9, as a result of which the memory plate (41) is rotated in counterclockwise direction and its hook-like engagement portion (41a) is disengaged from the engagement protrusion (42), which in turn allows the crank portion (30) and lock lever (54) to be rotated back towards their normal states (as indicated by the solid line in FIG. 6) by the biasing force of the torsion spring (53), and then, as the lock lever (54) is rotated back, the lock plate (51) is brought to engagement into its previously engaged one of the apertures (52). In this way, the seat (A) is positively returned to its home position and locked against movement.

It should be noted that the engagement point of the lock plate (51) relative to the apertures (52) depends upon the collision point where the memory plate (41) collides against the forward end (21a) of the lower rail (21), and therefore, such collision point is a criterion to determine a normally locked position or home position of the seat (A) in association with the memory device (4).

From the above description, in accordance with the present invention, it is appreciated that the formation of the crank portion (30) in the lock lever (54) and provision of the cylindrical actuator pin (33) produces a small localized or point contact between those two elements, and therefore, greatly reduced is the sliding friction of the actuator pin (33) against the lock lever (54), hence eliminating the wear or abrasion problem associated with the walk-in device (3) which is found in the aforementioned prior art. Further, advantageously, by virtue of the crank portion (30), the lock lever (54) per se is easy to rotate with a small force applied from the actuator pin (33), so that the walk-in operation of the seat (A)f is smoothly effected without requiring a relatively strong force at the operator side. The memory device (4) is also advantageous in terms of its simplified structure, which is not equipped with such projecting element as the guide plate (40'e) of the prior art, and thus, neither external damage nor failure takes place in the memory device.

Finally, it should be understood that the present invention is not limited to the illustrated embodiment, but any other modifications, additions, and replacements may structurally be possible without departing from the spirit and scope of the appended claims for the invention.

What is claimed is:

1. An automotive seat with a walk-in device, comprising:
   a seat cushion;
   a seat back which is rotatably connected to said seat cushion in a manner inclinable forwardly and backwardly relative to said seat cushion;
   a slide rail including a movable rail fixed to said seat and a stationary rail fixed on a floor side of automobile, said movable rail being slidably fitted to said stationary rail, said slide rail further including a biasing means for biasing said movable rail in a forward direction of said seat so as to bias said seat forwardly;
   a locking mechanism for locking and unlocking said movable rail at a desired point upon said stationary rail, said locking mechanism being operable by a shaft-like lock lever provided therewith;
   a walk-in device for allowing forward and backward movement of said movable rail in response to a forward inclination of said seat back, said walk-in device including:
   a lever means which is rotatably, pivotally provided at said movable rail;
   an actuator pin which is integrally fixed on said lever means; and
   a crank portion formed in said lock lever of said locking mechanism, said crank portion being so disposed as to be in contact with said actuator pin;
   a release wire by which said lever means is operatively connected with said seat back; and
   a memory device for actuating said locking mechanism to lock said movable rail at a predetermined home point upon said stationary rail when said seat is moved back to its original position,
   whereby a forward inclination of said seat back causes said lever means of said walk-in device to rotate via said release wire, thereby simultaneously rotating said actuator pin to push and rotate said crank portion, which in turn causes rotation of said lock lever in a direction to actuate said locking mechanism to release a locked state of said movable rail, and thus, said seat is caused to move forwardly by means of said biasing means.

2. The automotive seat as defined in claim 1, wherein said memory device includes an engagement means provided at said movable rail, and a memory plate which is provided at said lever means of said walk-in device, said memory plate being arranged such that it is to be engaged with said engagement means when said walk-in device is actuated to cause the forward movement of said movable rail, and when said movable rail is moved back, said memory plate is to be disengaged from said engagement means so as to reversely actuate said walk-in device to cause locking of said movable rail at a predetermined home point upon said stationary rail via said locking mechanism.

3. The automotive seat as defined in claim 1, wherein said lever means of said walk-in device is rotatably mounted, by means of a pin, on a base plate integral with a support plate which is fixed on an inner side of said movable rail, such that said lever means is free to rotate about said pin on a horizontal plane, wherein said actuator pin is formed in a cylindrical shape and erected fast upon one end of said lever means, and wherein the other end of said lever means is operatively connected via said release wire to a reclining device mounted at a point between said seat cushion and seat back, whereby a forward inclination of said seat back by operating said reclining device actuates said walk-in device via said release wire so as to rotate said lever means, thereby releasing a locked state of said movable rail thorough said walk-in device and locking mechanism.

4. The automotive seat as defined in claim 1, wherein said crank portion associated with said walk-in device is defined in said lock lever by bending a part of said lock lever upwardly in a generally inverted-U-shaped configuration, and wherein said crank portion is normally in a contact with said actuator pin, orienting obliquely upwards in relation to a longitudinal axis of said lock lever, thereby permitting said lock lever to be easily rotated by said actuator pin for actuating said locking mechanism.

5. The automotive seat as defined in claim 2, wherein said memory device further includes a forward end of said stationary rail, wherein said memory plate is formed in a generally hook shape, comprising a head portion, an abutment edge portion which is normally abutted against said engagement means, and a hook-like engagement portion which is to be engaged with said engagement means, wherein said memory plate is rotatable and biased by means of a spring in a direction towards said stationary rail, and wherein when said walk-device is actuated for moving forwardly said movable rail, said hook-like engagement portion is brought to engagement with said engagement means whereas, when moving back said movable rail, said head portion of said memory plate collides against said forward end of said stationary rail, as a result of which said memory plate is rotated, with its hook-like engagement means being disengaged from said engagement means, thereby actuating reversely said walk-in device to cause locking of said movable plate at a predetermined home point upon said stationary rail via said locking mechanism.

6. The automotive seat as defined in claim 2, wherein said memory plate and said engagement means are disposed laterally and longitudinally of said stationary plate.

* * * * *